J. R. MOFFATT.
TRIMMING MECHANISM.
APPLICATION FILED SEPT. 3, 1913.
1,237,802.
Patented Aug. 21, 1917.
3 SHEETS—SHEET 2.
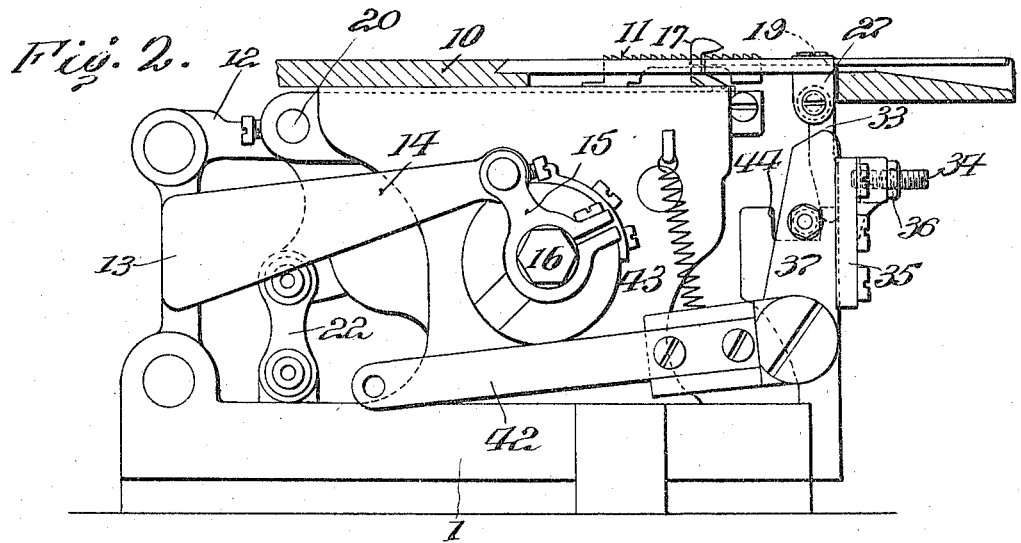
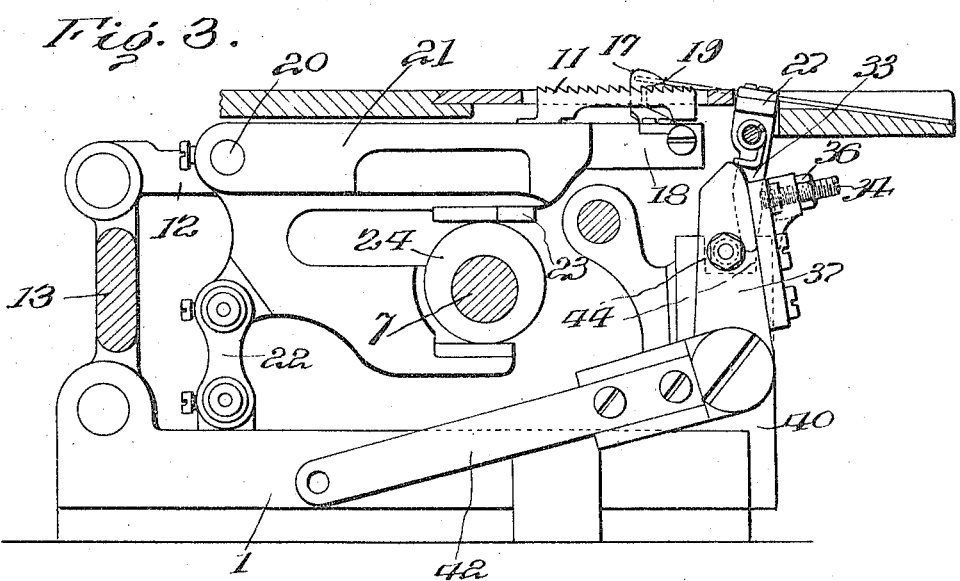
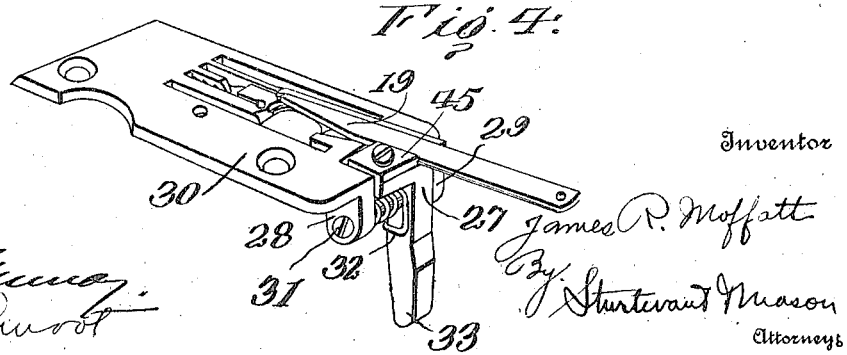
Witnesses
Inventor
James R. Moffatt
By Sturtevant Mason
Attorneys J. R. MOFFATT.
TRIMMING MECHANISM.
APPLICATION FILED SEPT. 3, 1913.
1,237,802.
Patented Aug. 21, 1917.
3 SHEETS—SHEET 3.
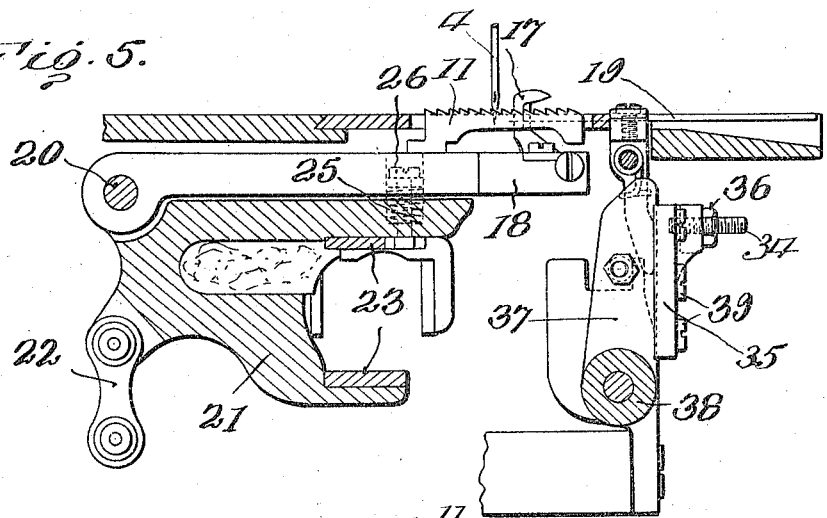
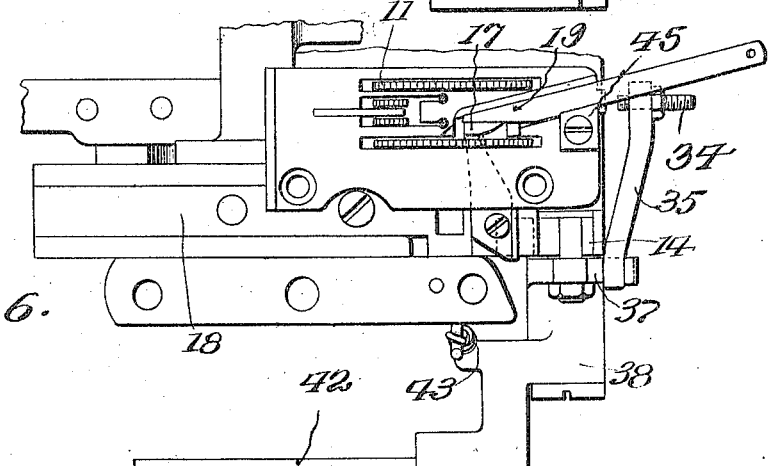
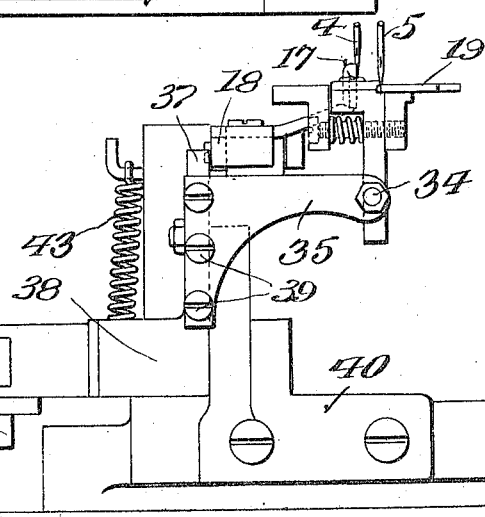

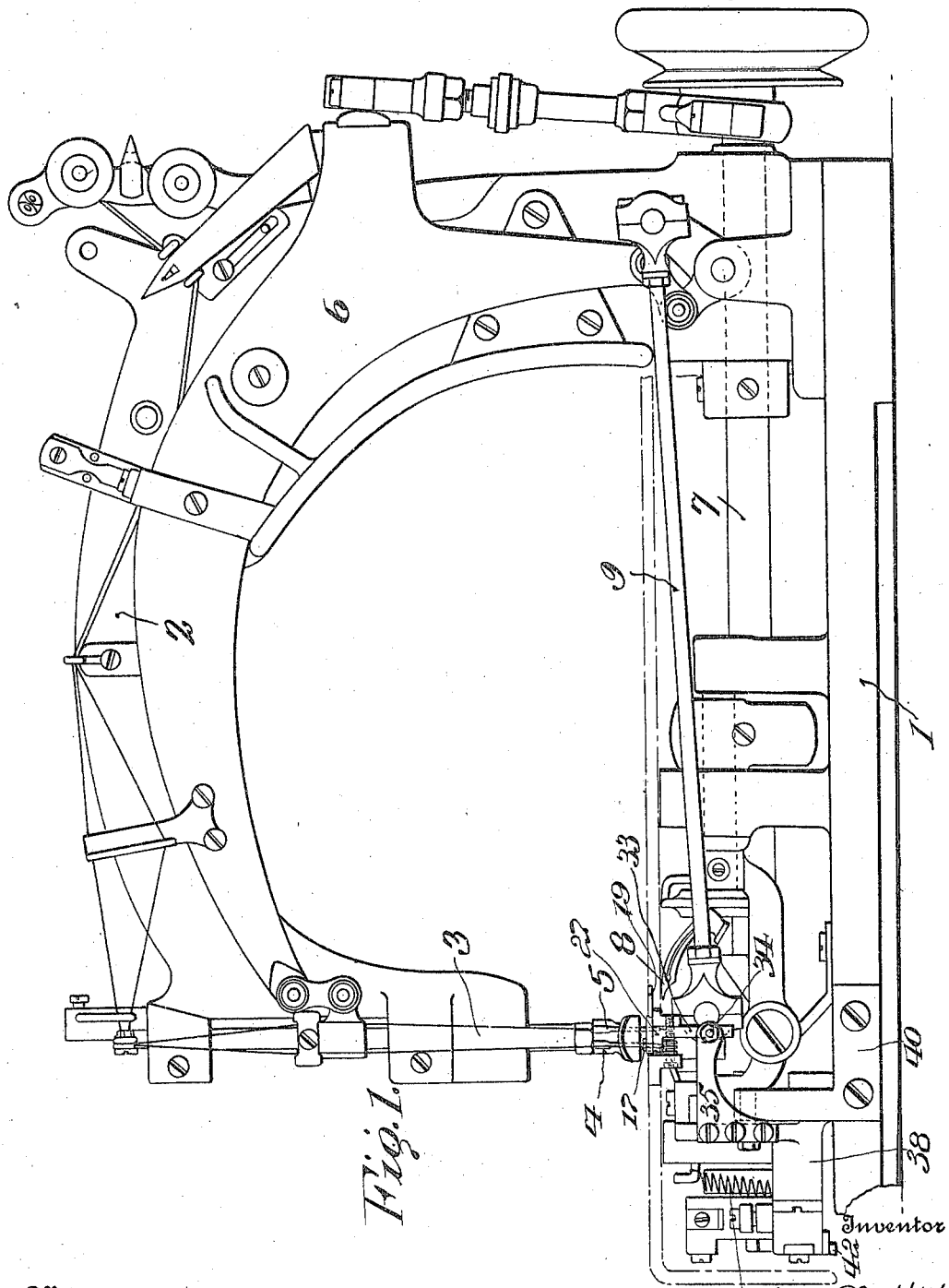

UNITED STATES PATENT OFFICE.

JAMES R. MOFFATT, OF CHICAGO, ILLINOIS, ASSIGNOR TO UNION SPECIAL MACHINE COMPANY, OF CHICAGO, ILLINOIS, A CORPORATION OF ILLINOIS.

TRIMMING MECHANISM.

1,237,802.　　Specification of Letters Patent.　　Patented Aug. 21, 1917.

Application filed September 3, 1913.　Serial No. 787,935.

*To all whom it may concern:*

Be it known that I, JAMES R. MOFFATT, a citizen of the United States, residing at Chicago, in the county of Cook, State of Illinois, have invented certain new and useful Improvements in Trimming Mechanism, of which the following is a description, reference being had to the accompanying drawing and to the figures of reference marked thereon.

The invention relates to new and useful improvements in trimming mechanisms, and more particularly to trimming mechanisms used in connection with sewing machines which are capable of being rendered effective or ineffective without stopping the stitching mechanism of the sewing machine.

Prior to my invention it has been common in the art to provide means for shifting the position of the movable trimming member without stopping the stitching mechanism in order to render the cutting action of the trimming mechanism ineffective. An object of the present invention is to provide a simplified mechanism for accomplishing this result of rendering the trimming mechanism ineffective without shifting the position of this movable trimming member.

A further object of the invention is to provide a trimming mechanism, which includes a movable trimming member overhanging the work support so as to penetrate between superposed layers of material and trim certain of said layers only, with devices whereby the lower coöperating trimming member may be shifted during the stitching operation to cause the material being cut to pass over said overhanging blade, or shifted so as to permit said overhanging blade to become effective to perform its cutting action.

These and other objects will in part be obvious, and will in part be hereinafter more fully described.

In the drawings, which show by way of illustration one embodiment of the invention, Figure 1 is a front elevation of a sewing machine, with a portion of the work support removed, which embodies my invention;

Fig. 2 is an end view of the machine showing the operating lever for shifting the lower trimming member;

Fig. 3 is a similar view showing the lever moved to render the trimming mechanism ineffective;

Fig. 4 is a perspective view of the throat plate, the lower trimmer support, and the lower trimming blade;

Fig. 5 is a transverse sectional view showing the operating mechanism for the movable trimming blade and the member for shifting the lower trimming blade;

Fig. 6 is a plan view showing the trimming mechanism and the devices for shifting the lower trimming member;

Fig. 7 is a front view of the parts shown in Fig. 6.

In the drawings I have shown my invention applied to a sewing machine wherein the stitching occurs subsequently to the trimming of the material. It will be obvious, however, that from certain aspects of the invention, this trimming mechanism may be otherwise located relative to the stitching mechanism, and may be, in fact, used entirely independent of any stitching mechanism if desired. The invention consists generally in providing a reciprocating trimmer blade which coöperates with a ledger blade to perform a shearing cut upon the fabric. This ledger blade is normally fixed or stationary—that is, said blade coöperates with a movable trimmer blade to sever the fabric. It is, however, movable to render the cutting blade ineffective, as will be hereinafter described. Inasmuch as this ledger blade has no movement in the normal cutting action of the blade on the fabric, it will be referred to hereinafter as a fixed or stationary trimmer blade. This stationary trimmer blade is mounted in a support which may be swung or moved at the will of the operator and without stopping the stitching mechanism, so as to bring the cutting edge of the stationary blade above the range of action of the movable cutting blade, and thereby render said movable cutting blade ineffective.

My invention is especially related to a trimming mechanism wherein the movable cutting blade is mounted and actuated by devices beneath the work support, and projects above and overhangs the work support. This overhanging cutting blade is formed with a forwardly projecting penetrating point, and said blade coöperates with a fixed or stationary ledger blade. This fixed or stationary ledger blade, as above noted, is mounted in a movable carrier or support so that it may be raised and lowered and thereby cause the material to either pass over the projecting point of the movable trimming blade or else allow said movable point to become effective to penetrate the material and the cutting blade to cut the material.

Referring more in detail to the drawings, I have shown my invention applied to a sewing machine consisting of a bed plate 1 and an overhanging arm 2, in which reciprocates a needle bar 3, carrying, as herein shown, two needles 4 and 5. The needle bar is reciprocated by a needle lever 6, which is operated from the main shaft 7 in the usual manner. Coöperating with the two needles 4 and 5 is a threaded looper 8, which is oscillated into and out of the needle loops by a link 9 connected to an extension on the needle lever.

The material to be cut rests on a work support 10, and is fed across the same and to the stitching mechanism by a feed dog 11, which is carried by a feed bar 12 pivoted to a feed rocker 13. This feed rocker 13 is oscillated by an arm 14 connected by a link 15 to a crank pin 16 on the end of the main shaft 7. The feed bar is raised and lowered in the usual manner.

Located slightly in advance of the needles, as shown in Fig. 5, is a movable trimming blade 17. This movable trimming blade is mounted on a supporting bar 18, located beneath the work support, and said blade projects above the work support and overhangs the same so as it reciprocates, its cutting edge will coöperate with a fixed or stationary blade 19 to perform a shearing cut on the fabric. Said movable cutting blade is also provided with a penetrating point. The bar 18 is preferably pivoted at 20 to an operating yoke 21, which, in turn, is pivoted to a link 22 attached at its other end to a post or lug on the bed plate. This yoke is provided with bearing plates 23, which rests upon an eccentric 24 carried by the main shaft 7. A spring 25, see Fig. 5, is located between the bar 18 and the yoke, and a bolt 26 compresses the spring and holds the bar 18 in a predetermined position relative to the yoke. So far as my present invention is concerned, however, this spring connection between the trimmer supporting bar and its operating yoke may be dispensed with. The essential features consist merely in providing a trimmer blade which is moved up and down by an actuating mechanism so as to coöperate with the relatively fixed or stationary blade.

The fixed or stationary blade 19 is mounted in a support 27, which is pivotally carried by downwardly projecting lugs 28 and 29, as herein shown formed integral with the throat plate 30 of the sewing machine. Said support 27 is free to move on a supporting shaft 31. The throat plate is cut away so as to allow the supporting shaft and the upper face of the stationary blade 19 to rest flush with the upper face of the throat plate when the parts are positioned, as shown in Figs. 2, 4 and 5. A spring 32 encircling the shaft 31 normally presses said support 27 so as to hold the stationary trimming blade in this position with its upper face flush with the surface of the throat plate.

The support 27 has a downwardly projecting arm 33 which is adapted to be engaged by an adjustable stud 34, mounted in the outer end of a bracket 35. This stud may be adjusted and held in adjusted position by suitable nut 36. The bracket 35 is secured to the arm 37 of a rock shaft 38 by suitable screws 39. This rock shaft is mounted on a supporting bearing 40, which is attached to the bed plate by suitable screws. The rock shaft is free to rotate or oscillate on its bearing and is moved thereon by an arm 42, which is preferably connected with a treadle or knee shift, so that the same may be shifted without requiring the attention of the hands of the operator. This arm 42 is normally raised by a spring 43 so as to hold the adjustable stud 34 away from contact with the arm 33, or so the stationary blade may be moved by the spring 32 into the position shown in Fig. 4, that is, with its upper face substantially flush with the upper face of the throat plate. A downward movement of the arm 42, brought about by depressing the treadle or operating the knee shift, will move the stud 34 into contact with the arm 33 and this will swing the support 27 on the shaft 31 and thus raise the inner end of the stationary blade 19, as shown, for example, in Fig. 3 of the drawings. By adjusting the stud 34, the position to which this stationary member is raised may be varied.

The bearing 40 is provided with stops 44, which limit the swing of the rock shaft for controlling the position of the stationary trimming blade. This stationary trimming blade 19 is detachably secured to the support 27 therefor by a clamping plate 45, which is of well-known construction in this type of machine. The blade is formed with inclined edges and the plate overlaps one of said inclined edges.

When the trimming mechanism is effective for trimming, the stationary blade is in horizontal position, as shown in Fig. 4. The movable blade 17 reciprocating up and down relative to said fixed or stationary blade, will cut the material passing underneath said movable blade by a downward shearing cutting action. This blade is so shaped that a plurality of layers of material, if desired, may be pressed to the cutting blade and the point will penetrate between the layers causing one of the layers to pass over said movable blade, while the other layer passes underneath the same and is cut. The position of the penetrating point of the movable blade may be readily varied to set the same for penetrating between layers of material of a certain thickness by shifting the bolt 26, which moves the supporting bar 18 relative to the actuating yoke for the trimmer blade.

Let us suppose that the trimmer is in action and cutting the material, and that a point is reached in the work where it is desired to render this cutting blade ineffective. The operator, by depressing the arm 42, will shift the support 27 for the stationary trimmer blade and raise the same at the trimming point to the position shown in Fig. 3. This raising of the lower trimming blade brings the same above the path of reciprocation of the penetrating point of the trimmer, or substantially so, and causes the layer of material which is being cut, to be lifted and carried over this movable trimmer blade by the action of the feed. This may all be accomplished without stopping the stitching mechanism, and in fact, without retarding its action. Then again, let us suppose that it is desirable to throw the trimming member into action while the stitching is going on, and while the material is passing over this trimming blade. The operator drops the lever 42 and this allows the stationary blade to be swung to its normal horizontal position, and the penetrating point is then exposed so that it will engage the material, press into the same, and begin its cutting action.

From the above construction it will be apparent that I have provided means whereby a movable trimming blade may be rendered effective or ineffective without varying the position of said movable blade. Therefore, the parts for accomplishing this result may be made few and of simple construction. Furthermore, the parts which are shiftable for rendering the trimmer blade effective or ineffective are only moved for bringing about this function. In other words, there is no movement of the shiftable parts necessary during the normal trimming operation of the machine.

As above noted, the trimming mechanism is preferably located in advance of the stitching mechanism, and when so disposed an edge of fabric may be trimmed and prepared for the stitching mechanism. In the present embodiment of the invention, where the trimming mechanism is in advance of a two-needle single thread carrying looper stitching mechanism, a cut edge may be prepared and directed between the needles, and said cut edge covered by the cross loops of the looper thread.

It is obvious that minor changes in the details of construction and the arrangement of parts may be made without departing from the spirit of the invention, as set forth in the appended claims.

Having thus described my invention, what I claim is:

1. A trimming mechanism including in combination a work support, a reciprocating trimming blade, a coöperating normally stationary blade, and means for moving said stationary blade in a vertical plane above the cutting surface of the reciprocating trimming blade to render the cutting action of the reciprocating blade ineffective without stopping the action of said reciprocating blade.

2. A trimming mechanism including in combination a work support, a reciprocating trimming blade, a coöperating normally stationary blade, and means for moving said stationary blade in a vertical plane above the cutting surface of the reciprocating trimming blade whereby the cutting action of the reciprocating blade may be rendered effective or ineffective without stopping the action of said reciprocating blade.

3. A trimming mechanism including a reciprocating trimming blade, a coöperating normally stationary blade, and means for moving said stationary blade to render the cutting action of the movable blade ineffective and automatic means for moving said stationary blade for rendering the movable blade effective when released by the operator.

4. A trimming mechanism including in combination a work support, a reciprocating trimming blade mounted beneath the work support, and projecting above and overhanging said work support, a normally stationary trimming blade coöperating with said movable blade, and means for moving said stationary blade so as to direct the material over the top of the movable blade and thereby render the same ineffective.

5. A trimming mechanism including in combination a work support, a reciprocating trimming blade mounted beneath the work support, and projecting above and overhanging said work support, a normally stationary trimming blade coöperating with said movable blade, and means for moving said stationary blade so as to direct the material over the top of the movable blade and thereby render the same ineffective, said means for moving the stationary blade being under the control of the operator and shiftable without stopping the reciprocations of the movable blade.

6. A trimming mechanism including a work support, a reciprocating trimmer blade mounted beneath said work support and projecting above and overhanging the same, said movable blade having a penetrating point, a normally stationary blade coöperating with said movable blade, and normally flush with the work support during the trimming action, and means whereby said stationary blade may be moved above the work support and above the path of reciprocation of the cutting edge of the movable blade.

7. A trimming mechanism including a work support, a reciprocating trimmer blade mounted beneath said work support and projecting above and overhanging the same, said movable blade having a penetrating point, a normally stationary blade coöperating with said movable blade, and normally flush with the work support during the trimming action, means whereby said stationary blade may be moved above the path of reciprocation of the cutting edge of the movable blade, and automatic means for returning said stationary blade to its normal flush position with the work support when released by the operator.

8. A trimming mechanism including in combination a work support, a reciprocating trimming blade, a supporting bar located beneath the work support for said trimming blade, said trimming blade being so constructed as to project above and overhang the work support, said blade having a forwardly projecting penetrating point, an actuating yoke for the supporting bar, and means whereby the position of the bar relative to the yoke may be adjusted, a normally stationary trimmer blade normally flush with the surface of the work support, and coöperating with said overhanging blade, and means for shifting said stationary blade whereby the same may be moved to a position above the path of reciprocation of said penetrating point.

9. A trimming mechanism including in combination a work support, a reciprocating trimming blade, a supporting bar located beneath the work support for said trimming blade, said trimming blade being so constructed as to project above and overhang the work support, said blade having a forwardly projecting penetrating point, an actuating yoke for the supporting bar and means whereby the position of the bar relative to the yoke may be adjusted, a normally stationary trimmer blade normally flush with the surface of the work support, and coöperating with said overhanging blade, means for shifting said stationary blade whereby the same may be moved to a position above the path of reciprocation of said penetrating point, and a spring for returning said stationary blade to its normal position when released by the operator.

10. A trimming mechanism including in combination a work support, a reciprocating trimming blade, a supporting bar located beneath the work support for said trimming blade, said trimming blade being so constructed as to project above and overhang the work support, said blade having a forwardly projecting penetrating point, an actuating yoke for the supporting bar and means whereby the position of the bar relative to the yoke may be adjusted, a normally stationary trimming blade normally flush with the surface of the work support during the trimming action, a pivoted support for said stationary blade, a spring for holding said blade in said normal flush position, and means under the control of the operator for shifting said support.

11. A trimming mechanism including in combination a work support, a reciprocating trimming blade, a supporting bar located beneath the work support for said trimming blade, said trimming blade being so constructed as to project above and overhang the work support, said blade having a forwardly projecting penetrating point, an actuating yoke for the supporting bar and means whereby the position of the bar relative to the yoke may be adjusted, a normally stationary trimming blade normally flush with the surface of the work support during the trimming action, a pivoted support for said stationary blade, a spring for holding said blade in said normal flush position, and means under the control of the operator for shifting said support, said last named means including limiting stops and an adjustable member whereby the extreme upward throw of the stationary blade may be varied.

12. A sewing machine including in combination stitch forming mechanism and a trimming mechanism having trimming blades located in advance of the stitching mechanism, a work support, one of said trimming blades being movable and so constructed as to project above and overhang the work support, said movable blade having a penetrating point, means for reciprocating said movable blade, the other of said trimming blades being normally stationary, and means for supporting said blade, whereby the position thereof may be shifted vertically for rendering the action of the movable blade effective or ineffective.

13. A sewing machine including in combination stitch forming mechanism and a trimming mechanism having trimming blades located in advance of the stitching mechanism, a work support, one of said trimming blades being movable and so constructed as to project above and overhang the work support, said movable blade having a penetrating point, means for reciprocating said movable blade, the other of said trimming blades being normally stationary, and means for supporting said blade, whereby the position thereof may be shifted for rendering the action of the movable blade effective or ineffective, said shiftable means for the stationary blade including a rock shaft under the control of the operator, stops for limiting the movement of the rock shaft, and an adjustable means for engaging and shifting the stationary trimmer blade.

14. The combination of stitch forming mechanism, a work support, a throat plate mounted on said work support, a trimmer support carried by said throat plate, a normally stationary trimmer blade mounted on said trimmer support, a movable trimmer blade mounted beneath the work support, and projecting above and overhanging said throat plate, and coöperating with said stationary blade, a spring for shifting said trimmer support to normally hold the stationary blade flush with the surface of the throat plate, and means under the control of the operator for shifting the support for the stationary trimmer for rendering the action of the movable trimmer effective or ineffective.

15. The combination of a work support having a slot formed therein, a trimming mechanism including a movable trimming member and a normally stationary trimming member, said stationary trimming member being mounted in said slot, and means for moving said stationary member in said slot to cover the cutting edge of the movable trimming member for rendering said trimming mechanism ineffective.

16. The combination of stitch forming mechanism, a work support having a slot formed therein, a trimming mechanism including a movable trimming member and a normally stationary trimming member, said stationary trimming member being mounted in said slot, means for moving said stationary member in said slot to cover the cutting edge of the trimming member for rendering the trimming mechanism ineffective, and devices for moving said stationary trimming member without stopping the stitching mechanism.

17. The combination of stitch forming mechanism, of a work support having a slot formed therein, a trimming mechanism including a movable trimming member and a normally stationary trimming member, said stationary trimming member being mounted in said slot, means whereby said stationary member may be moved in said slot to render the trimming mechanism effective or ineffective, and devices for moving said stationary trimming member without stopping the stitch forming mechanism, said means for moving the stationary trimming member including two levers coöperating with each other.

18. The combination of a throat plate, and a trimming mechanism including a movable trimming member and a normally stationary trimming member adapted to rest on and be supported by said throat plate, and means whereby said stationary member may be shifted in a vertical plane to render the trimming mechanism effective or ineffective.

19. The combination of a throat plate having a recess formed in its upper face adapted to receive a normally stationary trimmer blade, feed slots extending through said throat plate, lugs formed integral with said throat plate, and adapted to support said stationary trimmer blade, whereby said stationary trimmer blade may be shifted in a vertical plane relative to the upper face of the throat plate.

20. The combination of a work support and a trimming mechanism, including a movable trimmer blade and a normally stationary trimmer blade, means for clamping and holding the stationary trimmer blade from lateral movement relative to the movable blade, and means whereby said clamping and holding means for the stationary blade may be shifted to move the cutting edge of the stationary blade vertically in a direction parallel to the plane of movement of the movable cutting blade.

21. The combination of a feeding mechanism, a work support and a trimming mechanism, including a movable trimming blade and a normally stationary trimming blade, means for pivotally supporting said stationary trimming blade so that the same may be swung in a vertical plane parallel with the line of feed.

22. The combination of a feeding mechanism and a trimming mechanism, including a movable trimming blade movable in a vertical plane parallel with the line of feed, and a normally stationary trimming member, and means for supporting said stationary trimming member whereby it is held from lateral movement relative to said movable member, and whereby said stationary member may be moved in a vertical plane parallel with the line of feed for rendering the trimming mechanism effective or ineffective.

23. The combination of a feeding mechanism and a trimming mechanism, including a movable trimming blade movable in a vertical plane parallel with the line of feed, and a normally stationary trimming member, and means for supporting said stationary trimming member whereby it is held from lateral movement relative to said movable member, and whereby said stationary member may be moved in a vertical plane parallel with the line of feed for rendering the trimming mechanism effective or ineffective, said means for supporting said stationary trimming member including a pivotal connection, the axis of which is at right angles to the line of feed.

24. In a sewing machine, a work support, stitch forming mechanism, a trimming blade, means for operating said trimming blade, means for rendering said trimming blade ineffective comprising a member normally disposed in a plane below the cutting edge of said trimming blade, means for pivotally supporting said member at the forward end thereof, whereby the rear end of said member may be raised to deflect the material over said trimming blade.

25. A trimming mechanism for sewing machines comprising a work support, a movable trimming blade, means for operating said trimming blade in a fixed path, a stationary trimming blade coöperating with said movable blade and a treadle operated means for shifting said stationary blade, for deflecting the material out of the path of the movable cutting blade for rendering the trimming mechanism ineffective.

26. A trimming mechanism for sewing machines including in combination a work support, a movable trimming blade mounted beneath the work support and projecting above and overhanging said work support, means for oscillating said movable trimming blade in a fixed path, a normally stationary trimming blade coöperating with said movable blade and a treadle operated means for shifting said normally stationary trimming blade for rendering the cutting action of the movable trimming blade ineffective.

27. A trimming mechanism for sewing machines including in combination, a work support, a movable trimming blade mounted beneath the work support and projecting above and overhanging said work support, means for oscillating said movable trimming blade in a fixed path, said blade having its cutting edge on the lower face of said overhanging portion, treadle operated controlling means for deflecting the material over said blade for rendering the cutting action thereof ineffective, and a spring for returning said controlling means to normal position for rendering said trimming blade effective.

In testimony whereof, I affix my signature, in the presence of two witnesses.

JAMES R. MOFFATT.

Witnesses:
A. B. CLOTHIER,
C. McNEIL.

Copies of this patent may be obtained for five cents each, by addressing the "Commissioner of Patents, Washington, D. C."